(12) United States Patent
Shuto et al.

(10) Patent No.: US 7,135,211 B2
(45) Date of Patent: *Nov. 14, 2006

(54) RETARDATION PLATE, PROCESS FOR PRODUCING THE SAME, AND OPTICAL FILM

(75) Inventors: Shunsuke Shuto, Ibaraki (JP); Ikuo Kawamoto, Ibaraki (JP); Hironori Motomura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/493,659

(22) PCT Filed: Nov. 15, 2002

(86) PCT No.: PCT/JP02/11916

§ 371 (c)(1),
(2), (4) Date: Apr. 26, 2004

(87) PCT Pub. No.: WO03/042732

PCT Pub. Date: May 22, 2003

(65) Prior Publication Data

US 2005/0037155 A1    Feb. 17, 2005

(30) Foreign Application Priority Data

Nov. 15, 2001  (JP) .............................. 2001-349710

(51) Int. Cl.
*G02F 1/3363* (2006.01)
(52) U.S. Cl. .................. 428/1.3; 428/1.1; 349/117; 349/118; 252/299.01
(58) Field of Classification Search .................. 428/1.1, 428/1.3; 349/117–119, 127, 299.01, 299.68; 252/299.01, 299.66, 299.68, 299.67
See application file for complete search history.

(56) References Cited

U.S. PATENT DOCUMENTS

| | | | | |
|---|---|---|---|---|
| 5,498,450 A | * | 3/1996 | Akashi et al. | ............ 428/423.1 |
| 5,587,821 A | * | 12/1996 | Nakanishi et al. | ........... 349/118 |
| 5,620,781 A | * | 4/1997 | Akashi et al. | ............ 428/195.1 |
| 5,688,436 A | * | 11/1997 | Ohnishi et al. | ......... 252/299.01 |
| 5,693,253 A | * | 12/1997 | Ohnishi et al. | ......... 252/299.01 |
| 6,103,323 A | * | 8/2000 | Motomura et al. | ........... 428/1.3 |
| 6,208,396 B1 | * | 3/2001 | Shimizu et al. | ............. 349/119 |
| 6,261,649 B1 | * | 7/2001 | Takagi et al. | ................. 428/1.1 |
| 6,822,713 B1 | * | 11/2004 | Yaroshchuk et al. | ........ 349/117 |
| 6,885,423 B1 | * | 4/2005 | Shuto et al. | ................. 349/127 |
| 6,888,599 B1 | * | 5/2005 | Kawamoto et al. | .......... 349/118 |
| 7,037,443 B1 | * | 5/2006 | Shuto et al. | ........... 252/299.01 |

FOREIGN PATENT DOCUMENTS

| | | |
|---|---|---|
| JP | 9-3454 | 1/1997 |
| JP | 2000-304924 | 11/2000 |
| JP | 2001-100036 | 4/2001 |
| JP | 2001-213919 | 8/2001 |
| JP | 2002-348330 | 12/2002 |
| KR | 2001-0065713 A | 7/2001 |

OTHER PUBLICATIONS

JPO Website Machine English Translation of JP09003454, Kawada, Jan. 1997.*
First Office Action issued by State Intellectual Property Office of People's Republic of China, Aug. 26, 2005.

* cited by examiner

*Primary Examiner*—Rena Dye
*Assistant Examiner*—Sow-Fun Hon
(74) *Attorney, Agent, or Firm*—Westerman, Hattori, Daniels & Adrian, LLP.

(57) ABSTRACT

A retardation plate characterized by being obtained by laminating a homeotropic liquid-crystal film formed from a homeotropic liquid-crystal polymer of the side chain type or from a homeotropic liquid-crystalline composition comprising the side chain type liquid-crystal polymer and a photopolymerizable liquid-crystal compound to a stretched film having a retardation function. In the retardation plate, the retardation in the thickness direction can be regulated to a value in a wide range.

14 Claims, No Drawings

RETARDATION PLATE, PROCESS FOR PRODUCING THE SAME, AND OPTICAL FILM

This application is a 371 of PCT/JP02/11916 filed Nov. 15, 2002.

TECHNICAL FIELD

The present invention relates to a retardation plate obtained by laminating a homeotropic liquid-crystal film and a stretched film having a retardation function, and a method for producing the same. A retardation plate of this invention may be used for optical films, such as λ/4 film, a viewing angle compensation film, a compensating film, an elliptically polarization film, and a brightness enhancement film, alone or in combination with other optical films. Moreover, this invention relates to an image viewing displays, using the retardation plate and the optical film, such as a liquid-crystal display, an organic electroluminescence display, and a PDP.

BACKGROUND ART

In image viewing displays, such as a liquid-crystal display, birefringence by a liquid crystal etc. varies contrast etc. in accordance with variation of viewing angles. In order to prevent such contrast variation etc., there are proposed in liquid-crystal displays such a technique that disposes a retardation plate in a liquid-crystal cell, compensates optical characteristics based on birefringence, and thereby improves viewing angle characteristics. Although uniaxially or biaxially stretched films etc. are usually used as retardation plates for compensation, they fail to provide a viewing angle characteristic that is satisfactory for all liquid-crystal cells.

Japanese Patent Laid-Open No.2000-304924 official report discloses a continuous method for producing a retardation plate in which one or more heat-shrinkable films are adhered on one side or both sides of a long film composed of a thermoplastic resin, the long film is shrunk, in a state of gripped by a tenter, by function of shrinking force of the heat-shrinkable film in a width direction at a ratio (A) of no less than 0.7 to less than 1.0 times, and subsequently the obtained film is stretched and widened in the width direction concerned at a stretching ratio (%) that satisfies an equation or less (100−ratio (A)×100)×0.15, when a width of the film excluding the gripped section after the shrinking process is defined as 100.

Since the method gives stretching also in a thickness direction, it may provide a retardation plate having retardation also in the thickness direction. However, in the producing method, when in-plane main refractive indexes of the retardation plate obtained are defined as nx and ny, and a refractive index in a thickness direction is defined as nz, and nx>ny, Nz defined by Nz=(nx−nz)/(nx−ny) is −1.0<Nz<0.1, and stretching in the thickness direction has limitations, which cannot control the retardation in the thickness direction over a wide range. A long heat-shrinkable film is used in the method, is stretched by heat contraction in a thickness direction, and therefore, a resulting retardation plate obtained has an increased thickness as compared with the original long film. A thickness of the retardation plate obtained by the method is about 50 to 100 micrometers, and is not enough, as thinness required of a liquid-crystal display etc.

The present invention aims at providing a retardation plate that enables control of retardation over a wide range in a thickness direction, and providing a method for producing the same. This invention also aims at providing an optical film using the retardation plate, and furthermore providing an image viewing display using the retardation plate and the optical film.

DISCLOSURE OF THE INVENTION

As a result of wholehearted examinations by the present inventors, it was found out that a retardation plate shown below might attain the objectives, leading to completion of this invention.

That is, this invention relates to a retardation plate characterized by laminating a homeotropic liquid-crystal film formed from a homeotropic side chain type liquid-crystal polymer or from a homeotropic liquid-crystalline composition comprising the side chain type liquid-crystal polymer and a photopolymerizable liquid-crystalline compound with a stretched film having a retardation function.

According to a retardation plate of this invention, a homeotropic liquid-crystal film having retardation in a thickness direction is laminated with a stretched film having an in-plane retardation, and thus adjustment of thick nesses of the homeotropic liquid-crystal film enables control of the retardation in the thickness direction over a wide range. Accordingly, image viewing displays, such as liquid-crystal displays may be obtained that excellent visibility, such as contrast, over a wide viewing angle range, because of having excellent advanced compensation of displaying properties variation by viewing angle based on birefringences of liquid-crystal cells etc. The homeotropic liquid-crystal film can form a thin layer, therefore can control retardation in a thickness direction over a wide range, and provide a thin retardation plate.

As a homeotropic side chain type liquid-crystal polymer for forming a homeotropic liquid-crystal film in the retardation plate, a side chain type liquid-crystal polymer comprising a monomer unit (a) including a liquid-crystalline fragment side chain having positive refractive index anisotropy and a monomer unit (b) including a non-liquid-crystalline fragment side chain may preferably be used.

Although a homeotropic side chain type liquid-crystal polymer used in this invention is not especially limited, a liquid-crystal polymer that can form a homeotropic liquid-crystal layer on a substrate without vertical alignment layer provided thereon is preferable. Especially, a side chain type liquid-crystal polymer comprising a monomer unit (a) including a liquid-crystalline fragment side chain having positive refractive index anisotropy, and a monomer unit (b) including a non-liquid-crystalline fragment side chain may preferably be used.

In a retardation plate of this invention, Nz defined by Nz=(nx−nz)/(nx−ny) may satisfy −8<Nz<0.3, when in-plane main refractive indexes are defined as nx and ny, and a refractive index in a thickness direction is defined as nz and nx>ny. A retardation plate of this invention has a wide range of Nz defined above, and may highly compensate birefringence. For example, according to materials given in Example, (nx−nz) usually gives about −0.0180 to 0.0035, and (nx−ny) about 0.0020 to 0.0033.

Moreover, this invention relates to a method for producing the retardation plate characterized by laminating a homeotropic liquid-crystal film formed from a homeotropic side chain type liquid-crystal polymer or from a homeotropic liquid-crystalline composition comprising the side chain type liquid-crystal polymer and a photopolymerizable liquid-crystalline compound with a stretched film having a retardation function.

Furthermore, this invention relates to an optical film characterized by laminating further an at least one optical film with the retardation plate.

And moreover, this invention relates to an image viewing display characterized by applying the retardation plate or the optical film.

BEST MODE FOR CARRYING OUT THE INVENTION

As liquid-crystal polymers that can form a homeotropic liquid-crystal film in the present invention, for example, a side chain type liquid-crystal polymer comprising a monomer unit (a) including a liquid-crystalline fragment side chain having positive refractive index anisotropy, and a monomer unit (b) including a non-liquid-crystalline fragment side chain may be mentioned.

With the side chain type liquid-crystal polymer, homeotropic alignment of the liquid-crystal polymers can be obtained without using a vertical alignment layer. The side chain type liquid-crystal polymer has the monomer unit (b) including the non-liquid-crystalline fragment side chain having alkyl chain etc. in addition to the monomer unit (a) including the liquid-crystalline fragment side chain of usual side chain type liquid-crystal polymers. It is thought that the monomer unit (b) including a non-liquid-crystalline fragment side chain, even without using a vertical alignment film, probably attains liquid-crystal state, for example, by heat treatment, and makes a resultant nematic liquid-crystal phase demonstrate, showing homeotropic alignment.

The monomer unit (a) has a side chain having nematic liquid-crystallinity, and, for example, such monomer units may be mentioned that are represented by a general formula (a):

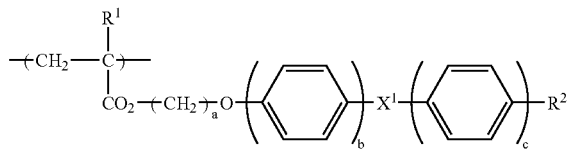

where, $R^1$ represents a hydrogen atom or a methyl group, a represents a positive integer of 1 to 6, $X^1$ represents a —$CO_2$-group or a —OCO-group, $R^2$ represents a cyano group, an alkoxy group having a carbon number of 1 to 6, a fluoro group or an alkyl group having a carbon number of 1 to 6, and b and c represent integers of 1 or 2, respectively.

Moreover, the monomer unit (b) has a liner side chain, for example, such a monomer unit may be mentioned that is represented with a general formula (b):

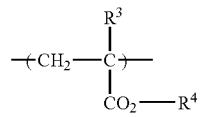

where, $R^3$ represents a hydrogen atom or a methyl group, $R^4$ represents an alkyl group having a carbon number of 1 to 22, a fluoro alkyl group having a carbon number of 1 to 22 or a group represented with a general formula (b1):

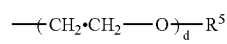

where, d represents a positive integer of 1 to 6, and $R^5$ represents an alkyl group having a carbon number of 1 to 6.

In addition, a ratio of the monomer unit (a) and the monomer unit (b) is not especially limited, and may also be varied depending on kinds of the monomer units. Since the side chain type liquid-crystal polymer tends to show less liquid-crystal mono-domain alignment property as a percentage of the monomer unit (b) increases, preferably (b)/{(a)+(b)}=0.01 to 0.8 (mole ratio). Especially it is more preferably 0.1 to 0.5.

As a liquid-crystal polymer that can form a homeotropic liquid-crystal film, the side chain type liquid-crystal polymer comprising the monomer unit (a) including a liquid-crystalline fragment side chain and a monomer unit (c) including liquid-crystalline fragment side chain having an alicyclic cyclic structure may be mentioned.

With the side chain type liquid-crystal polymer, homeotropic liquid-crystal polymer can be obtained without using a vertical alignment layer. It is thought that the side chain type liquid-crystal polymer has the monomer unit (c) including the liquid-crystalline fragment side chain having an alicyclic cyclic structure in addition to the monomer unit (a) including a liquid-crystalline fragment side chain as of usual side chain type liquid-crystal polymer. The monomer unit (c), even without using a vertical alignment film, probably attains liquid-crystal state, for example, by heat treatment, and makes a resultant nematic liquid-crystal phase demonstrate, showing homeotropic alignment.

The monomer unit (c) has a side chain exhibiting a nematic liquid-crystallinity, and, for example, such a monomer unit may be mentioned that is represented with a general formula (c):

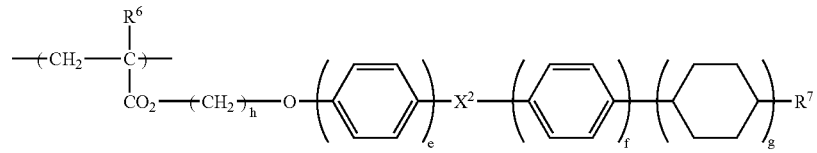

where, $R^6$ represents a hydrogen atom or a methyl group, h represents a positive integer of 1 to 6, $X^2$ represents a —$CO_2$-group or a —OCO-group, e and g represent integers of 1 or 2, f represents an integer of 0 to 2, and $R^7$ represents a cyano group and an alkyl group having a carbon number of 1 to 12.

In addition, a ratio of the monomer unit (a) and the monomer unit (c) is not especially limited, and may also be varied depending on kinds of the monomer units. Since the side chain type liquid-crystal polymer tends to show less liquid-crystal mono-domain alignment property as a percentage of the monomer unit (c) increases, preferably (c)/{(a)+(c)}=0.01 to 0.8 (mole ratio). Especially it is more preferably 0.1 to 0.6.

Liquid-crystal polymers that can form a homeotropic liquid-crystal layer are not limited to the illustrated examples having the monomer units, and more than one of the illustrated monomer units may be appropriately combined.

A weight average molecular weight of the side chain type liquid-crystal polymer is preferably in a range of 2000 to 100,000. By adjusting a weight average molecular weight within this range, performance as a liquid-crystal polymer may be demonstrated. Since there is tendency for an excessively small weight average molecular weight of the side chain type liquid-crystal polymer to exhibit poor film formation property of aligned layer, the weight average molecular weight is more preferably 2500 or more. On the other hand, since there is tendency for an excessively large weight average molecular weight to exhibit poor alignment tendency as liquid crystal, disabling easy formation of uniformly aligned state, the weight average molecular weight is more preferably 50,000 or less.

Moreover, the above-illustrated side chain type liquid-crystal polymer can be prepared by copolymerization of acrylic based monomers or methacrylic based monomers corresponding to the monomer unit (a), the monomer unit (b), and the monomer unit (c). And monomers corresponding to the monomer unit (a), the monomer unit (b), and the monomer unit (c) may be synthesized by well-known methods. Preparation of the copolymer may be performed according to, for example, conventional polymerization methods for acrylic based monomers, such as radical polymerization methods, cationic polymerization methods, and anion polymerization methods etc. In addition, when a radical polymerization method is used, various kinds of polymerization initiators may be used, and especially, polymerization initiators, such as azobis-iso-butyronitril, benzoyl peroxide, etc. may preferably be used that has medium, not excessively high nor excessively low, decomposition temperatures.

Photopolymerizable liquid-crystalline compound may be blended to the side chain type liquid-crystal polymer to obtain liquid-crystalline composition. Since the side chain type liquid-crystal polymer can form film on a substrate without using a vertical alignment layer, a liquid-crystal film having a lower Tg may be designed. In order to improve durability so as to be used for application of liquid-crystal displays etc., homeotropic liquid-crystalline composition including photopolymerizable liquid-crystalline compound may preferably be used to these liquid-crystals films. After being aligned and fixed, the homeotropic liquid-crystalline composition is irradiated with light such as ultraviolet radiation.

A photopolymerizable liquid-crystalline compound is a liquid-crystalline compound that has at least one unsaturated double bond, such as acryloyl groups or methacryloyl groups, as a photopolymerizable functional group, of which nematic liquid-crystalline compound is preferably used. As the photopolymerizable liquid-crystalline compounds, acrylates and methacrylates that copolymerizable with the monomer unit (a) may be illustrated. In order to improve durability, compounds that have two or more photopolymerizable functional groups are preferable as the photopolymerizable liquid-crystalline compounds. As such photopolymerizable liquid-crystalline compounds, cross link-type nematic liquid-crystal monomer represented with a following general formula (d) may be illustrated:

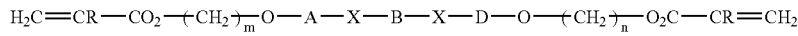

where, R represents a hydrogen atom or a methyl group; A and D represent independently a 1,4-phenylene group or a 1,4-cyclo hexylene group, respectively; X independently represents a —COO-group, a —OCO-group, or a —O-group, respectively; B represents a 1,4-phenylene group, a 1,4-cyclo hexylene group, a 4,4'-biphenylene group, or a 4,4'-bicyclo hexylene group; and m and n independently represent integers of 2 to 6, respectively. Moreover, as photopolymerizable liquid-crystalline compounds, there may be mentioned: compounds whose terminal "$H_2C=CR—CO_2—$" in the general formula (d) is substituted by a vinyl ether group or an epoxy group, and compounds whose "—$(CH_2)_m$—" and/or "—$(CH_2)_n$—" is substituted by "—$(CH_2)_3$—$C^*H(CH_3)$—$(CH_2)_2$—" or "—$(CH_2)_2$—$C^*H(CH_3)$—$(CH_2)_3$—."

The above-mentioned photopolymerizable liquid-crystalline compound gives liquid-crystal state by heat treatment, which may show, for example, a nematic liquid-crystal layer, and provide homeotropic alignment together with the side chain type liquid-crystal polymer. And subsequently the photopolymerizable liquid-crystalline compound is polymerized or cross-linked to improve durability of the homeotropic liquid-crystal film.

A ratio of the photopolymerizable liquid-crystalline compound and the side chain type liquid-crystal polymer in the liquid-crystalline composition is not especially limited, and appropriately determined in consideration of durability of the homeotropic liquid-crystal film to be obtained. Usually, preferably, by weight ratio, (photopolymerizable liquid-crystalline compound):(side chain type liquid-crystal polymer)=0.1:1 to 30:1, more preferably 0.5:1 to 20:1, and still more preferably 1:1 to 10:1.

The liquid-crystalline composition usually includes a photopolymerization initiator. As photopolymerization initiators, various kinds of initiators may be used without any limitation. As photopolymerization initiators, for example, Irgacure 907, for example, Irgacure 184, Irgacure 651, Irgacure 369, etc. by Ciba Specialty Chemicals may be illustrated. In consideration of kinds of the photopolymerizable liquid-crystal compounds, compounding ratios of the liquid-crystalline composition, etc., the amount of the photo polymerization initiator is added that does not disturb homeotropic alignment of the liquid-crystalline composition. Usually, the amount is preferably about 0.5 to 30 parts by weight base on 100 parts by weight of the photopolymerizable liquid-crystalline compound, and especially preferably 3 parts or more by weight.

Production of the homeotropic liquid-crystal film is performed by a following method: the homeotropic side chain type liquid-crystal polymer is coated on a substrate, subsequently, the side chain type liquid-crystal polymer is spontaneously aligned in a liquid-crystal state, and then the aligned liquid-crystal is fixed in a state that the alignment state is maintained. Moreover, a following method is adopted when using a homeotropic liquid-crystalline composition comprising the side chain type liquid-crystal polymer and the photopolymerizable liquid-crystalline compound: the homeotropic liquid-crystalline composition is coated on a substrate; subsequently, the liquid-crystalline composition is spontaneously aligned in a liquid-crystal state; then the aligned liquid-crystal is fixed in a state that the alignment state is maintained, and then is light irradiated.

Substrates that the side chain type liquid-crystal polymer or the liquid-crystalline composition coat may have any shape of glass substrates, metallic foils, plastic sheets, or plastic films. The substrate does not necessarily require a vertical alignment film provided thereon. A thickness of the substrate is usually about 10 to 1000 micrometers.

Any kinds of plastic films may be used without special limitation as long as they are not affected nor give any variation by temperatures at which alignment is conducted. For example, there may be mentioned films formed of transparent polymers: polyester based polymers, such as polyethylene terephthalate and polyethylene naphthalene's; cellulose based polymers, such as diacetyl celluloses and triacetyl celluloses; polycarbonate based polymers; and acrylic polymers, such as poly methylmethacrylates etc. Moreover, there may also be mentioned films formed of transparent polymers: styrene based polymers, such as polystyrenes and acrylonitrile-styrene copolymers; olefin based polymers, such as polyethylenes, polypropylenes, polyolefines having cyclic or norbornene structure, and ethylene-propylene copolymers; vinyl chloride based polymers; and amido polymers etc., such as nylons and aromatic polyamides. Furthermore, there may be mentioned films formed of transparent polymers: imido polymers, sulfone based polymers, polyether sulfone based polymers, polyether ether ketone based polymers, polyphenylene sulfide based polymers, vinyl alcohol based polymers, vinylidene chloride based polymers, vinyl butyral based polymers, allylate based polymers, polyoxymethylene based polymers, and epoxy based polymers, and mixtures of the above-mentioned polymers. Among the above-mentioned films, plastic films having a high degree of hydrogen bond and usually used as optical films, such as triacetyl celluloses and polycarbonate-norbornene polyolefines, may preferably be used.

As metal films, the film made of for example aluminum etc. may be mentioned.

In commercially available plastic films, plastic films formed of polymer materials with norbornene structure have excellent optical characteristics, such as ZEONOR (trade name, manufactured by Nippon Zeon Co., Ltd.), ZEONEX (trade name, manufactured by Nippon Zeon Co., Ltd.), and ARTON (trade name, manufactured by JSR) etc.

An anchor coat layer may be formed on a substrate without a vertical alignment film provided thereon. Strength of the substrate improves by the anchor coat layer, resulting in securing of excellent homeotropic alignment.

As anchor coat materials, a metal alkoxide sol, in particular a metal silicon alkoxide sol may preferably be used. Metal alkoxides are usually used as an alcoholic solution. Since the anchor coat layer is required a uniform layer having flexibility, a thickness of the anchor coat layer is preferably about 0.04 to 2 micrometers, and more preferably about 0.05 to 0.2 micrometers.

As methods for coating the above-mentioned anchor coat materials on a substrate, for example, a roll coating method, a photogravure coating method, a spin coating method, a bar coating method, etc. may be used. After coating of the solution, a solvent is removed, obtained layer is then heated to accelerate a sol-gel reaction, and finally a transparent vitreous polymer layer is formed. A metal silicon alkoxide gel layer is formed from a metal silicon alkoxide sol. As methods for solvent removal or promotion of reaction, a drying at room temperatures, a drying with a baking furnace, a heating on a hot plate, etc. may conventionally be utilized.

In addition, when the substrate has an anchor coat layer, a binder layer is disposed between a substrate and an anchor coat layer, or materials that strengthen adhesion with the substrate are contained in the anchor coat layer, and thereby adhesion between the substrate and the anchor coat layer may be improved. Improvement in adhesion between the substrate and the anchor coat layer gets easy peeling in an interface of the anchor coat layer and the liquid-crystal film, which enables easy peeling of the substrate after attachment of a stretched film to the liquid-crystal film having a retardation function.

As binder materials used for formation of the binder layer, materials that can improve adhesion between a substrate (especially polymer material) and an anchor coat layer (transparent vitreous polymer film) may be used without any limitation. As binder materials, coupling agents may be mentioned. A coupling agent is an agent having functional group(s) that can easily bond with both of the substrate (especially polymer material) and the anchor coat layer (transparent vitreous polymer film), and for example, silane coupling agents, titanium coupling agents, zirconium coupling agents, etc. may be illustrated. Silane coupling agent has large improvement effect on adhesion among them. The coupling agent may be used as a material for strengthening adhesion with the substrate. Also as the coupling agent concerned, silane coupling agents are preferable.

The above-mentioned binder materials are diluted appropriately with solvents are coated on a substrate. As coating methods, for example, a roll coating method, a photogravure coating method, a spin coating method, a bar coating method, etc. may be adopted. As methods for removing solvents and for promoting reaction with heating after coating, usually, drying at room temperatures, drying with a drying furnace, heating on a hot plate, etc. may be used.

As methods for coating the side chain type liquid-crystal polymer or the liquid-crystalline composition onto a substrate (or the anchor coat layer on the substrate), a solution coating method using a solution comprising the side chain type liquid-crystal polymer or the liquid-crystalline composition dissolved in a solvent, or a melt-coating method for coating the molten liquid-crystal polymer or the molten liquid-crystalline composition may be mentioned. Among them, the solution coating method for coating the solution of the side chain type liquid-crystal polymer or the liquid-crystalline composition on the supporting substrate is preferable.

Solvents for preparing the solution are dependent on the kinds of side chain type liquid-crystal polymers, photopolymerizable liquid-crystalline compounds, or substrates, and usually following solvents may be used, but are not limited to: halogenated hydrocarbons, such as chloroform, dichloromethane, dichloroethane, tetrachloroethane, trichloroethylene, tetrachloroethylene, and chlorobenzene; phenols, such as phenol and para chlorophenol; aromatic hydrocarbons, such as benzene, toluene, xylene, methoxybenzene, 1,2-dimetoxybenzene; and other solvents, such as acetone, ethyl acetate, tert-butyl alcohol, glycerin, ethylene glycol, triethylene glycol, ethylene glycol monomethyl ether, diethylene glycol dimethyl ether, ethyl Cellosolve, butyl Cellosolve, 2-pyrrolidone, N-methyl-2-pyrrolidone, pyridine, triethylamine, tetrahydrofuran, dimethylformamide, dimethylacetamide, dimethylsulfoxide, acetonitrile, butyronitrile, carbon disulfide, cyclohexanone etc. A concentration of the solution is dependent on solubility of side chain type liquid-crystal polymers or liquid-crystalline compositions to be used, and a thickness of aligned liquid-crystal layer finally obtained, and is, but not limited to, usually in a range of 3 to 50% by weight, and preferably 7 to 30% by weight.

A thickness of the coated homeotropic liquid-crystal film formed of the side chain type liquid-crystal polymer or the liquid-crystalline composition is preferably about 1 to 10 micrometers. Moreover, especially for precise control of a thickness of the homeotropic liquid-crystal film, since a stage of coating onto a substrate almost determines the thickness, control of the concentration of the solution, the thickness of the coating film, etc. needs to be especially carefully performed.

As methods for coating the solution of the side chain type liquid-crystal polymer or the liquid-crystalline composition, which is adjusted to a desired concentration using the above-mentioned solvents, to the anchor coat layer on the substrate, for example, a roll coating method, a photogravure coating method, a spin coating method, a bar coating method, etc. may be used. The solvent is removed after coating and a liquid-crystal polymer layer or a liquid-crystalline composition layer is formed on the substrate. Conditions for removal of the solvent is not especially limited as long as most of the solvent is removed, or the liquid-crystal polymer layer or the liquid-crystalline composition layer do not flow around nor flow down. Usually, the solvent is removed using methods, such as drying at room temperatures, drying in a drying furnace, and heating on a hot plate.

Subsequently, the side chain type liquid-crystal polymer layer or the liquid-crystalline composition layer formed on a supporting substrate is made in a liquid-crystal state and is spontaneously aligned. For example, heat treatment is performed so as to give the side chain type liquid-crystal polymer or the liquid-crystalline composition within a liquid-crystal temperature range, and they are homeotropically aligned in liquid-crystal state. The heat treatment method may be performed by the same method as the above-mentioned drying methods. The heat treatment temperature is varied depending on the kinds of the side chain type liquid-crystal polymers or the liquid-crystalline compositions, and supporting substrates to be used, and usually, but not limited to, is in a range of 60 to 300° C., and preferably in a range of 70 to 200° C. Moreover, the heat treatment period of time is varied depending on the heat treatment temperature, and the kinds of the side chain type liquid-crystal polymers or the liquid-crystalline compositions and kinds of substrates to be used, and usually, but not limited to, is in a range of 10 seconds to 2 hours, and preferably of 20 seconds to 30 minutes. When a heat treatment period of time is shorter than 10 seconds, there is a possibility that formation of homeotropic alignment may not adequately advance.

Cooling operation is performed after the heat treatment. Displacing the homeotropic liquid-crystal film after heat treatment into a room temperature atmosphere from a heating atmosphere during the heat treatment operation may perform cooling operation. Forced cooling, such as by air cooling and by water cooling, may be performed. By cooling not more than a glass transition temperature of the side chain type liquid-crystal polymer, alignment of the homeotropically aligned layer of the side chain type liquid-crystal polymer is fixed.

For the liquid-crystalline composition, by irradiating the aligned layer of thus fixed homeotropic liquid-crystal, the photopolymerizable liquid-crystalline compound is polymerized or cross-linked to fix the photopolymerizable liquid-crystalline compound, resulting in a homeotropic liquid-crystal layer having improved durability. Light irradiation is, for example, UV irradiation. In order to promote the reaction adequately, UV irradiation conditions are preferably in inert gas atmosphere. Usually, a high pressure mercury ultraviolet lamp having illumination of approximately 80 to 160 $mW/cm^2$ is typically used. Lamps of another kind, such as meta-halide UV lamp and incandescent tube, may also be used. Moreover, adjustment of temperatures is adequately performed by cooling treatments by cold mirror, water cooling, and others or by increase in line velocities so as to give a temperature of the liquid-crystal layer surface upon UV irradiation in a liquid-crystal temperature range.

Thus, a thin film of the side chain type liquid-crystal polymer or the liquid-crystalline composition is formed, then is fixed, while alignment is being maintained, and thus aligned liquid-crystal layer having homeotropic alignment is obtained. The aligned liquid-crystal layer has molecules that are aligned in a same direction. Therefore, it is well known that fixation or stabilization of an alignment vector of this aligned liquid-crystal layer, and preservation of those anisotropy physical properties are attained, and optical properties of such a thin film are realized, and the film may be used for various applications. The aligned liquid-crystal layer is a thin film having a uniaxially positive birefringence.

Alignment of the homeotropic liquid-crystal layer obtained as mentioned above may be quantified by measuring an optical retardation of the liquid-crystal layer at angles inclined from a perpendicular incidence. In case of homeotropic liquid-crystal layer, this retardation value is symmetrical to a perpendicular incidence. Several kinds of methods can be used for measurement of the optical retardation, and, for example, an automatic birefringence measuring apparatus (product made by ORC Co., Ltd.) and a polarization microscope (product made by Olympus Corporation) may be used. This homeotropic liquid-crystal layer looks black between crossed Nicole's polarizers. Thus, homeotropic alignment property was evaluated.

When in-plane main refractive indexes are defined as $nx$ and $ny$, and a refractive index in a thickness direction is defined as $nz$ and $nx>ny$, and when approximately a thickness $d(micrometer)=1$ to 10, the homeotropic liquid-crystal film thus obtained has approximately $(nx-ny)=0$ to $0.0005$, and approximately $(nx-nz)=-0.1200$ to $-0.1030$, for example, in case of materials described in Examples. In general, approximately $nx=1.5314$ to $1.5354$, approximately $ny=1.5314$ to $1.5354$, and approximately $nz=1.6391$ to $1.6472$.

In a retardation plate of this invention, the homeotropic liquid-crystal film and a stretched film having a retardation function are laminated together.

Examples of the stretched film having a retardation function include, for example, there may be mentioned: birefringent films obtained by stretching films formed of polycarbonates, norbornene based resins, polyvinyl alcohols, polystyrenes, polymethylmethacrylates, polypropylenes, and suitable polymers, such as other polyolefines, polyallrylates, and polyamides; aligned films formed of liquid-crystal materials, such as liquid-crystal polymers; and films having aligned layer of liquid-crystal materials supported with film.

Examples of the above-mentioned stretched films include those as follows: when in-plane main refractive indexes are defined as nx and ny, and a refractive index in a thickness direction is defined as nz and nx>ny, and when a thickness d (micrometer)=approximately 25 to 30, for example, in materials given in Examples, films having (nx−ny)=0.0040 to 0.0060 and (nx−nz)=0.0040 to 0.0060 may be used. In general, they have approximately nx=1.5930–1.5942, approximately ny=1.5850–1.5887, and approximately nz=1.5850–1.5883.

A retardation plate of this invention may be obtained by manufacturing a homeotropic liquid-crystal film, using a stretched film having a retardation function as a substrate. It may also be obtained by transferring a homeotropic liquid-crystal film manufactured on a substrate to a stretched film having a retardation function via an adhesive layer. A retardation plate of this invention can control Nz over a wide range irrespective of arrangement angles.

Adhesives for forming adhesive layers are not especially limited, and for example, adhesives using acrylic based polymers, silicone based polymers, polyesters, polyurethanes, polyamides, polyethers, and polymers, such as fluorine based and rubber based, as base polymer are suitably selected to be used. Especially, adhesives having excellent optical transparency, excellent weather resistance and heat resistance, showing adhesive property as moderate wet ability, coagulation property, and adhesive power, such as acrylic based adhesives, may preferably be used.

Suitable methods may be used for formation of adhesive layer. As an example, there may be mentioned a method in which a base polymer or a composition thereof is dissolved or dispersed in a solvent comprising an independent suitable solvent or a mixture thereof, such as toluene and ethyl acetate to prepare a adhesive solution with about 10 to 40% by weight of concentration, and the obtained solution is then directly applied on the liquid-crystal layer by suitable developing methods, such as flow casting method and coating method, or a method in which a adhesive layer formed on a separator according to the above-mentioned method is transferred on the liquid-crystal layer. Moreover, in the adhesive layer, for example, resins of natural product or synthesized product, in particular resins that give pressure sensitive adhesivity, additives, such as fillers comprising glass fibers, glass beads, metal powders, other inorganic powders, etc., pigments and colorants, and antioxidants may be included. In addition, the adhesive layer may be of adhesive layers including micro particles to give optical diffusibility.

Furthermore, where the homeotropic liquid-crystal film is transferred through an adhesive layer to the stretched film having the retardation function, surface treatment of the homeotropic liquid-crystal film surface may improve adhesiveness with the adhesive layer. Methods of surface treatment are not especially limited, and surface treatment methods that can maintain transparency of the liquid-crystal layer surface, such as a corona discharge treatment, a sputtering treatment, a low pressure UV irradiation, and a plasma treatment, may preferably be adopted. Among these, the corona discharge treatment is preferably.

Optical films, such as a polarizing plate, may further be laminated onto the obtained retardation plate. Hereinafter, descriptions about examples in which an optical film is further laminated to the retardation plate will be described.

Polarizing plates may be used as an optical film applied to image viewing displays, such as liquid-crystal display. Polarizing plate usually has protective film(s) on one side or both sides of a polarizer. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, which include boric acid or potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, which include boric acid or potassium iodide, and in water bath.

Protective film(s) provided on one side or both sides of the polarizer preferably have excellent transparency, mechanical strength, and heat stability, water shielding property, and excellent isotropy. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned. In addition, film-formed heat curing type and ultraviolet curing type resins, such as acrylic based, urethane based, acrylic urethane based, epoxy based, and silicone based, may be mentioned. A thickness of the protective film is, in general, 500 micrometers or less preferably 1 to 300 micrometers, and more preferably 5 to 200 micrometers.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the protection film may have as little coloring as possible. Accordingly, a protection film having a retardation value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a retardation value (Rth) of −90 nm through +75 nm in a thickness direction. The retardation value (Rth) in a thickness direction is preferably −80 nm through +60 nm, and especially preferably −70 nm through +45 nm.

The protective films are preferably cellulose based polymer, such as triacetyl cellulose, in consideration of polarizing characteristics and durability, and more preferably triacetyl cellulose film. When protective films are provided on both sides of the polarizer, protective films formed of the same polymer material may be used on both sides, and protective films formed of different polymer materials etc. may also be used. The polarizer and the protective films are conventionally closely attached via aqueous adhesives etc. Examples of the aqueous adhesives include polyvinyl alcohol based adhesives, gelatin based adhesives, vinyl based latex based, aqueous based polyurethanes, aqueous polyesters, etc.

A hard coat layer may be prepared, or antireflection processing, processing aiming at sticking prevention, diffusion or anti glare may be performed onto the face on which the polarizing film of the above described protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

A laminating plate that a polarizing plate laminated to the retardation plate may be used as an elliptically polarizing plate or a circularly polarizing plate. Description will be given about the elliptically polarizing plate or the circularly polarizing plate. These plates change a linearly polarized light into an elliptically polarized light or a circularly polarized light, change an elliptically polarized light or a circularly polarized light into a linearly polarized light with a retardation plate, or change a polarizing direction of a linearly polarized light. Especially as retardation plates that change a linearly polarized light into a circularly polarized light, or a circular polarized light into a linearly polarized light, a so-called quarter wavelength plate (also referred to as λ/4 plate is used. A half wavelength plate (also referred to as λ/2 plate) is usually used, when changing a polarizing direction of a linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

Moreover, as mentioned above, the retardation plate is laminated to a polarizing plate as a viewing angle compensation film, and is used as a wide viewing angle polarizing plate. A viewing angle compensation film is a film for extending viewing angles in order to give a comparatively clear image in the case where a screen of a liquid-crystal display is observed from a little diagonal direction not vertical to the screen.

As such a viewing angle compensation retardation plate, two directionally stretched films having birefringence, such as films processed by biaxially stretching and stretching in two directions mutually perpendicular, and inclined alignment films may be used in addition to the above-mentioned examples. As inclined alignment films, for example, there may be mentioned a film obtained by a method in which a heat shrinking film is adhered to a polymer film, then the combined film is stretched and/or shrunk under a condition of being influenced by a heat-shrinking force, or a film being aligned in an oblique direction. A viewing angle compensation film can be appropriately combined for the purpose of prevention of coloring by a variation of visual recognition angles based on retardation by a liquid-crystal cell etc., and of expansion of a viewing angle providing excellent visibility etc.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

Although, besides the above-mentioned examples, optical layers laminated in practical use are not especially limited, for example, one or more of optical layers used for formation of a liquid-crystal display etc., such as a reflective plate and a transflective plate, may be used. Especially, a reflection type polarizing plate or a transflective polarizing plate in which a reflection plate or a transflective reflection plate is further laminated on an elliptically polarizing plate or a circularly polarizing plate, or a polarizing plate in which a brightness enhancement film is further laminated on a polarizing plate may be mentioned.

A reflective layer is prepared on a polarizing plate to give a reflection type polarizing plate, and this type of plate is used for a liquid-crystal display in which an incident light from a viewing side (display side) is reflected to give a display. This type of plate does not require a built-in light sources, such as a back light, but has an advantage that a liquid-crystal display may easily be made thinner. A reflection type polarizing plate may be formed using suitable methods, such as a method in which a reflective layer made of metal etc. is, if required, attached to one side of a polarizing plate through a transparent protective layer etc.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

In the above-mentioned elliptically polarizing plate and reflection type elliptically polarizing plate, a polarizing plate or a reflection type polarizing plate is laminated with a retardation plate together in a suitable combination. These may be formed by separately laminating these elliptically polarizing plates etc. sequentially in a producing process of a liquid-crystal display so as to give a combination of a polarizing plate (reflection type) and a retardation plate. Those preliminarily laminated so as to give the optical films, such as elliptically polarizing plate, are superior in stability of quality, lamination workability etc., thus leading to advantages of improved manufacturing processes for liquid-crystal displays.

An adhesive layer may also be provided to a retardation plate and an optical film of this invention. The adhesive layer may be used for adhesion to a liquid-crystal cell, and also it may be used for lamination of optical layers. Suitable arrangement angle may be given to those optical axes according to required retardation properties in adhesion of the optical film.

Adhesives that form adhesive layers are not especially limited, but for example, same adhesives as used for attachment between the homeotropic liquid-crystal layer and translucent films may be used. Moreover, same methods may be used.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Although descriptions about an embodiment of this invention will, hereinafter, be given in relation to Examples, it cannot be overemphasized that this invention is not limited to these Examples. Obtained homeotropic liquid-crystal films were evaluated for alignment properties.

Example 1

Ethyl silicate 2% solution in ethyl acetate and isopropyl alcohol (trade name COLCOAT P, manufactured by COL-COAT Corporation) was coated as a sol solution for anchor coating onto a plastic film (manufactured by Toray Industries, Inc. thickness 50 micrometers) that include polyethylene terephthalate as a polymer material, by a photogravure roll coating method. Subsequently, obtained film was heated for 30 seconds at 130° C. to form a transparent vitreous polymer film (0.08 micrometers).

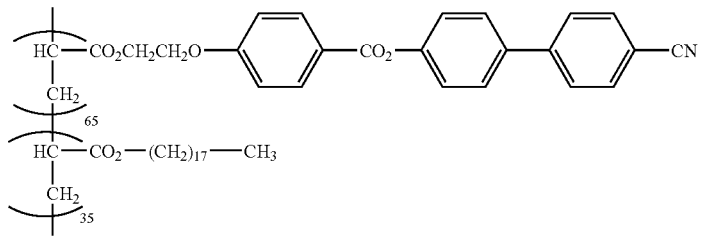

On the anchor coat layer provided on the film base material by a bar coating method, was coated a solution in which a side chain type liquid-crystal polymer 5 parts by weight represented by the above-mentioned chemical formula (the numbers in the formula represent mol % of monomer unit, shown in block format for convenience, a weight average molecular weight 5000), a photopolymerizable liquid-crystalline compound showing nematic liquid-crystal layer (manufactured by BASF A.G., PaliocolorLC242) 20 parts by weight, and a photo polymerization initiator (manufactured by Ciba Specialty Chemicals, Irgacure 907) 5% by weight (to photopolymerizable liquid-crystalline compound) were dissolved in cyclohexanone 75 parts by weight. Subsequently, the coated film was heated for 2 minutes at 80° C., and was then cooled to a room temperature for a short time to homeotropically align the liquid-crystal layer and it was fixed by transiting into a glass state with alignment maintained to give a homeotropic liquid-crystal layer. Furthermore, the fixed homeotropic liquid-crystal layer was irradiated with ultraviolet rays, and a homeotropic liquid-crystal film (thickness of 1.0 micrometers) was formed.

(Homeotropic Alignment)

When a sample (homeotropic liquid-crystal film with a substrate) was observed from a vertical direction to the film surface using a polarization microscope with crossed Nicol polarizer, nothing was observed from front side. This meant that homeotropic alignment was confirmed. That is, it was found that an optical retardation had not generated. Transmitted light was observed, when this film was tilted and observed by the crossed Nicol polarizer with incident light entered from oblique direction.

Moreover, this film was measured for an optical retardation using an automatic birefringence measurement equipment. Light measured was entered into the sample surface from vertical or oblique directions, and homeotropic alignment was confirmed from the optical retardation and a chart of the angle of incident light measured. In homeotropic alignment, a retardation (front retardation) in a vertical direction to a sample surface gives almost zero. When a retardation was measured from an oblique direction to a slow axis direction of the liquid-crystal layer for this sample, the retardation value increased with increase in angles of incidence of measured light. This means that a homeotropic alignment was obtained. Based on the above-mentioned results, it was determined that homeotropic alignment was in an excellent state.

In the homeotropic liquid-crystal film, nx=1.5315, ny=1.5314, and nz=1.6472.

(Attachment of Stretched Film)

Subsequently, the homeotropic liquid-crystal film was attached on a stretched film having polycarbonate as a polymer material: a retardation plate (manufactured by NITTO DENKO CORPORATION., NRF, thickness of 30 micrometers, nx: 1.5930, ny: 1.5887, nz: 1.5883) through a adhesive layer (15 micrometers) formed with an acrylic based adhesive. And the substrate with an anchor coat layer was separated to obtain a retardation plate having a homeotropic liquid-crystal film and a polycarbonate stretched film that were laminated together.

Example 2

Except for using a homeotropic liquid-crystal film having a thickness of 1.9 micrometers in Example 1, a same method as in Example 1 was used to produce a retardation plate. It had excellent homeotropic alignment. In the homeotropic liquid-crystal film, nx: 1.5349, ny: 1.5349, and nz: 1.6402.

Example 3

Except for using a homeotropic liquid-crystal film having a thickness of 2.5 micrometers in Example 1, a same method as in Example 1 was used to producer a retardation plate. It had excellent homeotropic alignment. In the homeotropic liquid-crystal film, nx: 1.5334, ny: 1.5333, and nz: 1.6433.

Example 4

Except for using a homeotropic liquid-crystal film having a thickness of 5 micrometers in Example 1, a same method as in Example 1 was used to producer a retardation plate. It had excellent homeotropic alignment. In the homeotropic liquid-crystal film, nx: 1.5345, ny: 1.5345, and nz: 1.6411.

Example 5

Except for using a homeotropic liquid-crystal film having a thickness of 10 micrometers in Example 1, a same method as in Example 1 was used to producer a retardation plate. It had excellent homeotropic alignment. In the homeotropic liquid-crystal film, nx: 1.5354, ny: 1.5354, and nz: 1.6391.

Comparative Example 1

A 20% by weight solution of a polycarbonate, having about 80,000 molecular weight, formed of a condensation polymer of phosgene and bisphenol A in methylene chloride was flow-cast continuously on a steel drum, then films obtained was sequentially separated off, and dried to obtain a polycarbonate film having a retardation of almost zero, and a thickness of 60 micrometers. Biaxially stretched polyester films were adhered on both sides of the film through acrylic based adhesive layers. The obtained film was shrunk by 0.88 times in a width direction at 168° C., in a state being gripped through grips of a tenter, subsequently was stretched at a stretching ratio of 1.2% [(100−0.88×100)×0.1], and then the biaxially stretched polyester film was separated to obtain a retardation plate.

Comparative Example 2

Except for stretching a film at a stretching ratio of 0.4% [(100−0.94×100)×0.067] after shrinking by 0.94 times in a width direction at 162° C. in Comparative example 1, a same method as in Comparative example 1 was used to produce a retardation plate.

(Evaluation)

The retardation plates obtained in Examples and Comparative examples were measured for the main refractive indexes nx, ny, and nz in planes and in thickness directions using an automatic birefringence measuring equipment (automatic birefringence measuring equipment KOBRA21ADH, manufactured by Oji Scientific Instruments), and then Nz was calculated. Moreover, retardation plates obtained in Examples and Comparative examples were also measured for thickness. Table 1 shows results.

TABLE 1

| | Nz | Main refractive index | | | Thickness (micrometer) |
|---|---|---|---|---|---|
| | | nx | ny | nz | |
| Example 1 | 0.24 | 1.5912 | 1.5883 | 1.5905 | 46 |
| Example 2 | −0.46 | 1.5905 | 1.5877 | 1.5918 | 46.9 |
| Example 3 | −1.0 | 1.5900 | 1.5873 | 1.5927 | 47.5 |
| Example 4 | −3.0 | 1.5883 | 1.5857 | 1.5961 | 50 |
| Example 5 | −6.75 | 1.5854 | 1.5830 | 1.6016 | 55 |
| Comparative example 1 | −0.40 | 1.5904 | 1.5884 | 1.5912 | 67 |
| Comparative example 2 | 0.25 | 1.5906 | 1.5886 | 1.5901 | 64 |

It is recognized that in the Examples Nz's have wide margins and thus thin retardation plates are obtained as compared with those in Comparative examples,

INDUSTRIAL APPLICABILITY

This invention is useful as a retardation plate, and it may be used as various optical films, such as a λ/4 film, a viewing angle compensation film, an compensating film, an elliptically polarization film, and a brightness enhancement film, alone or in combination with other optical films. These retardation plates and optical films may preferably be applied for image viewing displays, such as a liquid-crystal display, an organic electroluminescence viewing display, and a PDP.

The invention claim is:

1. A retardation plate comprising
   a homeoffopic liquid-crystal film formed from a homeotropic side chain type liquid-crystal polymer or from a homeotropic liquid-crystalline composition comprising a homeotropic side chain type liquid-crystal polymer and
   a photopolymerizable liquid-crystalline compound laminated with a stretched film having a retardation function,
   wherein said homeotropic side chain type liquid-crystal polymer is a side chain type liquid-crystal polymer comprising a monomer unit (a) including a liquid-crystalline fragment side chain having positive refractive index anisotropy represented by general formula (a) and a monomer unit (b) including a non-liquid-crystalline fragment side chain represented by general formula (b), general formula (a):

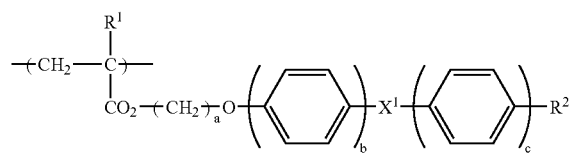

where, $R^1$ represents a hydrogen atom or a methyl group, a represents a positive integer of 1 to 6, $X^1$ represents a —$CO_2$-group or a —OCO-group, $R^2$ represents a cyano group, an alkoxy group having a carbon number of 1 to 6, a fluoro group or an alkyl group having a carbon number of 1 to 6, and b and c represent integers of 1 or 2, respectively;

general formula (b):

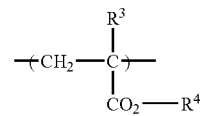

where, $R^3$ represents a hydrogen atom or a methyl group, $R^4$ represents an alkyl group having a carbon number of 1 to 22, a fluoro alkyl group having a carbon number of 1 to 22 or a group represented by general formula (b1):

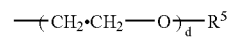

where, d represents a positive integer of 1 to 6, and $R^5$ represents an alkyl group having a carbon number of 1 to 6.

2. The retardation plate according to claim 1, wherein the homeotropic side chain type liquid-crystal polymer is a side chain type liquid crystal polymer comprising said monomer unit (a) and said monomer unit (b) and further comprising a monomer unit (c) having a side chain exhibiting a nematic liquid-crystallinity represented by general formula (c):

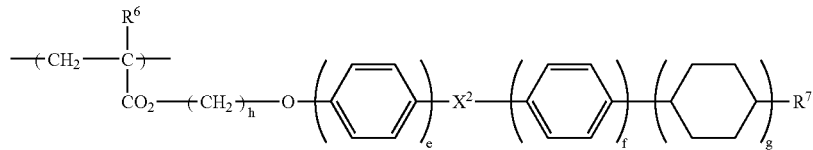

where, $R^6$ represents a hydrogen atom or a methyl group, h represents a positive integer of 1 to 6, $X^2$ represents a —$CO_2$-group or a —OCO-group, e and g represent integers of 1 or 2, f represents an integer of 0 to 2, and $R^7$ represents a cyano group and an ailcyl group having a carbon number of 1 to 12.

3. The retardation plate according to claim 2, wherein Nz defined by Nz=(tx−nz)/(nx−ny) satisfies −8<Nz<0.3, when in-plane main refractive indexes of the retardation plate are defined as nx and ny, and a refractive index in a thickness direction of the retardation plate is defined as nz, and nx>ny.

4. A method for producing the retardation plate according to claim 2, comprising laminating a homeotropic liquid-crystal film formed from a homeotropic side chain type liquid-crystal polymer or from a homeotropic liquid-crystalline composition comprising the side chain type liquid-crystal polymer and a photopolymerizable liquid-crystalline compound with a stretched film having a retardation function.

5. An optical film comprising at least one optical film further laminated with the retardation plate according to claim 2.

6. An image viewing display comprising the retardation plate according to claim 2.

7. The retardation plate according to claim 1, wherein Nz defined by Nz=(tx−nz)/(nx−ny) satisfies −8<Nz<0.3, when in-plane main refractive indexes of the retardation plate are defined as nx and ny, and a refractive index in a thickness direction of the retardation plate is defined as nz, and nx>ny.

8. A method for producing the retardation plate according to claim 1, comprising laminating a homeotropic liquid-crystal film formed from a homeotropic side chain type liquid-crystal polymer or from a homeotropic liquid-crystalline composition comprising the side chain type liquid-crystal polymer and a photopolymerizable liquid-crystalline compound with a stretched film having a retardation function.

9. An optical film comprising at least one optical film further laminated with the retardation plate according to claim 1.

10. An image viewing display comprising the retardation plate according to claim 1.

11. The retardation plate according to claim 1, wherein Nz defined by Nz=(nx−nz)/(nx−ny) satisfies −8<Nz<0.3, when in-plane main refractive indexes of the retardation plate are defined as nx and ny, and a refractive index in a thickness direction of the retardation plate is defined as nz, and nx>ny.

12. A method for producing the retardation plate according to claim 1, comprising laminating a homeotropic liquid-crystal film formed from a homeotropic side chain type liquid-crystal polymer or from a homeotropic liquid-crystalline composition comprising the side chain type liquid-crystal polymer and a photopolymerizable liquid-crystalline compound with a stretched film having a retardation function.

13. An optical film comprising at least one optical film further laminated with the retardation plate according to claim 1.

14. An image viewing display comprising the retardation plate according to claim 1.

* * * * *